(12) United States Patent
Gocke

(10) Patent No.: US 10,569,694 B2
(45) Date of Patent: Feb. 25, 2020

(54) HEADLAMP FOR A MOTOR VEHICLE

(71) Applicant: Bayerische Motoren Werke Aktiengesellschaft, Munich (DE)

(72) Inventor: Tim Gocke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/128,677

(22) Filed: Sep. 12, 2018

(65) Prior Publication Data

US 2019/0009706 A1 Jan. 10, 2019

Related U.S. Application Data

(63) Continuation of application No. PCT/EP2017/053893, filed on Feb. 21, 2017.

(30) Foreign Application Priority Data

Mar. 16, 2016 (DE) ........................ 10 2016 204 342

(51) Int. Cl.
*B60Q 1/08* (2006.01)
*F21S 41/143* (2018.01)
(Continued)

(52) U.S. Cl.
CPC ............ *B60Q 1/085* (2013.01); *F21S 41/143* (2018.01); *F21S 41/255* (2018.01); *F21S 41/645* (2018.01); *F21Y 2115/10* (2016.08)

(58) Field of Classification Search
CPC .................................................... F21S 41/645
See application file for complete search history.

(56) References Cited

U.S. PATENT DOCUMENTS

2002/0015305 A1* 2/2002 Bornhorst ............. F21S 10/007
362/293
2008/0239746 A1 10/2008 Wuller et al.
(Continued)

FOREIGN PATENT DOCUMENTS

DE 10 2005 041 234 A1 3/2007
DE 10 2009 024 894 A1 12/2010
(Continued)

OTHER PUBLICATIONS

International Search Report (PCT/ISA/210) issued in PCT Application No. PCT/EP2017/053893 dated May 8, 2017 with English translation (six (6) pages).
(Continued)

*Primary Examiner* — Alexander K Garlen
*Assistant Examiner* — Eric T Eide
(74) *Attorney, Agent, or Firm* — Crowell & Moring LLP

(57) ABSTRACT

A headlamp for a motor vehicle, in particular a front headlamp, includes a first illumination device and a second illumination device for jointly generating a light distribution in front of the headlamp. The first illumination device is provided for generating a static portion of the light distribution and the second illumination device is provided for generating a dynamic portion of the light distribution. The second illumination device has a multi-aperture projection display having an illuminant and a planar digital image generator and also an array of projection lenses. The digital image generator has segments having a variable division of the respective segment into transmissive and light-non-transmissive regions. Each projection lens is assigned to a segment of the digital image generator, such that upon illumination of the array by the illuminant at least some of the segments are projected in front of the headlamp by the assigned projection lenses. The headlamp is configured in
(Continued)

such a way that the digital image generator generates the dynamic portion of the light distribution during operation of the headlamp in the motor vehicle by varying the division into transmissive and light-non-transmissive regions for at least some of the segments.

12 Claims, 2 Drawing Sheets

(51) Int. Cl.
    *F21S 41/255*     (2018.01)
    *F21S 41/64*     (2018.01)
    *F21Y 115/10*     (2016.01)

(56) References Cited

U.S. PATENT DOCUMENTS

| | | | |
|---|---|---|---|
| 2014/0146290 A1 | 5/2014 | Sieler et al. | |
| 2014/0268837 A1* | 9/2014 | Simchak | B60Q 1/12 362/465 |
| 2015/0029409 A1* | 1/2015 | Chen | F21S 41/16 349/5 |
| 2015/0191115 A1* | 7/2015 | Yamamura | F21S 41/143 315/82 |
| 2016/0010811 A1* | 1/2016 | Benitez | F21S 41/143 362/509 |
| 2016/0065921 A1 | 3/2016 | Sieler et al. | |
| 2016/0265733 A1 | 9/2016 | Bauer et al. | |
| 2017/0120801 A1* | 5/2017 | Asaoka | B60Q 1/143 |
| 2017/0129389 A1* | 5/2017 | Asaoka | B60Q 1/08 |
| 2017/0276980 A1* | 9/2017 | Kauschke | F21S 41/135 |

FOREIGN PATENT DOCUMENTS

| | | |
|---|---|---|
| DE | 10 2011 076 083 A1 | 11/2012 |
| DE | 10 2012 103 313 A1 | 10/2013 |
| DE | 10 2013 208 625 A1 | 11/2014 |
| DE | 11 2013 003 050 T3 | 3/2015 |
| DE | 10 2013 221 953 A1 | 5/2015 |
| EP | 0 738 904 A1 | 10/1996 |
| EP | 2 338 729 A1 | 6/2011 |
| JP | 2011-22311 A | 2/2011 |
| WO | WO 2015/058227 A1 | 4/2015 |

OTHER PUBLICATIONS

German-language Written Opinion (PCT/ISA/237) issued in PCT Application No. PCT/EP2017/053893 dated May 8, 2017 (seven (7) pages).

German-language Search Report issued in counterpart German Application No. 102016204342.0 dated Oct. 10, 2016 with partial English translation (ten (10) pages).

* cited by examiner

1

HEADLAMP FOR A MOTOR VEHICLE

CROSS REFERENCE TO RELATED APPLICATIONS

This application is a continuation of PCT International Application No. PCT/EP2017/053893, filed Feb. 21, 2017, which claims priority under 35 U.S.C. § 119 from German Patent Application No. 10 2016 204 342.0, filed Mar. 16, 2016, the entire disclosures of which are herein expressly incorporated by reference.

BACKGROUND AND SUMMARY OF THE INVENTION

The invention relates to a headlamp for a motor vehicle, in particular a front headlamp.

The prior art has disclosed the dynamic modification of the light distribution of a motor vehicle headlamp using mechanically movable light modules. In this way, it is possible to optimize the illumination of the region in front of the headlamp depending on various conditions. By way of example, it is possible to create cornering light, in which the headlamp shines into the curve during cornering. Likewise, it is possible to realize an antiglare high beam, in which certain regions of the high beam distribution that would lead to dazzling of traffic ahead or oncoming traffic are masked.

Conventional headlamps with the functionality of a dynamic light production are disadvantageous in that a complicated mechanism has to be integrated in the headlamp to this end.

It is an object of the invention to develop a headlamp for a motor vehicle that can be used to produce a dynamic component of the headlamp light in a simple manner.

This and other objects are achieved by a headlamp according to the invention for a motor vehicle such as an automobile, for example. The headlamp is preferably a front headlamp. The headlamp comprises a first illumination device and a second illumination device, which together produce a light distribution in front of the headlamp. The first illumination device serves to produce a static component of the light distribution, whereas the second illumination device is provided for producing a dynamic component of the light distribution. The term static component should be understood to mean that this component is unchanging within the light distribution, although the light distribution as a whole may be movable where necessary, for example in the case of a height adjustment of the headlamp in the motor vehicle. The term dynamic component should be understood to mean that this component is changeable over time within the light distribution in order to modify regions of the generated light distribution in terms of form and/or brightness as a result thereof.

The headlamp according to the invention is distinguished by virtue of the second illumination device comprising a multi-aperture projection display having an illuminant and a planar digital image generator, and an array of projection lenses. The digital image generator contains segments with a changeable division of the respective segment in transmissive and light-opaque regions. In a preferred variant, a transmissive region represents a region with a transmittance of 100%. Nevertheless, transmissive regions may also have a lower transmittance where necessary. By contrast, a light-opaque region always has a transmittance of 0%. The division in transmissive and light-opaque regions can be changed by virtue of the sizes of the transmissive and light-opaque regions being changed. However, a change of the division in transmissive and light-opaque regions is also present if the transmittance of transmissive regions is changed since the use of modified transmissive regions results in a different division. Further, the division in transmissive and light-opaque regions can be chosen within a segment in such a way that the segment is transmissive over the whole area thereof or light-opaque over the whole area thereof.

Each projection lens is assigned to a segment of the digital image generator, that is the number of segments corresponds to the number of projection lenses. When the array is illuminated using the illuminant, at least some of the segments are projected in front of the headlamp by the assigned projection lenses. A segment preferably comprises a multiplicity of pixels of the digital image generator, in particular at least 0.5 megapixels (500,000 pixels) of the digital image generator. As a result of this, it is possible to generate sharp-edged structures for a respective projection lens and in the corresponding projection.

The headlamp is configured in such a way that the digital image generator produces the dynamic light distribution during operation of the headlamp in the motor vehicle by changing the division of transmissive and light-opaque regions for at least some of the segments. Expressed differently, the headlamp comprises a control device for actuating the digital image generator in such a way that the dynamic component of the light distribution is produced.

The invention is based on the concept of using a multi-aperture projection display with a digital image generator, known per se, to generate dynamic light effects in the headlamp light. In contrast to the prior art, this requires no mechanism in the headlamp; instead, the change in the light distribution is effectuated purely by actuating a digital image generator.

In a preferred variant, the multi-aperture projection display also comprises an array of field lenses arranged between the illuminant and the planar image generator, in addition to the array of projection lenses. Preferably, one or more LEDs and/or, optionally, one or more of laser diodes, too, are used as illuminants in the projection display. The projection lenses of the multi-aperture projection display are preferably round lenses with a diameter of 2000 µm or less, in particular of 1000 µm or less (e.g. 800 µm).

In a particularly preferred embodiment, use is made in the headlamp according to the invention of a multi-aperture projection display as described in document DE 10 2009 024 894 A1 or in document DE 10 2011 076 083 A1. The entire disclosures of these documents are expressly incorporated by reference herein.

In a preferred embodiment, a low beam distribution, a high beam distribution and/or an antiglare high beam is producible using the headlamp according to the invention, depending on the mode of operation of the headlamp.

Preferably, the headlamp according to the invention is configured in such a way that the dynamic component of the light distribution produced by the second illumination device is produced during the operation of the headlamp in the motor vehicle depending on one or more driving parameters of the motor vehicle and/or one or more parameters in the surroundings of the motor vehicle.

In a particularly preferred embodiment, a dynamic light/dark boundary of a low beam distribution is produced using the second illumination device in one mode of operation of the headlamp, as a result of which a cornering light, known per se, can be realized. Alternatively, or additionally, the width of the light distribution can be modified using the second illumination device in one mode of operation of the headlamp and/or objects in the surroundings of the motor vehicle can be illuminated more strongly or less strongly. As a result of this, it is possible to realize one or more functionalities of a city light, freeway light, guide light, marking light, construction-site light and emergency maneuvering light, explained in the detailed description, and optionally other functionalities, too.

In a particularly preferred embodiment, the first illumination device of the headlamp according to the invention is a macro-optical illumination device without a multi-aperture projection display. Expressed differently, the first illumination device is an illumination device without lenses or an illumination device with one or more macro-optical lenses. Here, and below, a macro-optical lens should be understood to mean a lens that, in a plan view, has a minimal extent of 1 cm or more and, in particular, of 3 cm or more. Preferably, the first illumination device contains a maximum of 25 lenses and, in particular, at most five lenses. Depending on the configuration, the first illumination device can comprise an illumination unit with projection optics and/or an illumination unit with reflection optics. As a result of using the just-described first illumination device without a multi-aperture projection display, it is possible to realize a static component of the light distribution by a simple and cost-effective headlamp module.

In a further, particularly preferred configuration of the headlamp according to the invention, an LCD display, in particular a TFT display, is used as the digital image generator of the second illumination device.

Depending on the type of multi-aperture projection display used in the headlamp according to the invention, the transmissive regions in the respective segments can have a fixed transmittance of 100% or a variable positive transmittance of at most 100%. Expressed differently, the digital image generator can be used, where necessary, to change the division of the respective segments in transmissive and opaque regions by way of a variation of the transmittance of the transmissive regions.

In addition to the above-described headlamp, the invention further relates to a motor vehicle that comprises one or more of the headlamps according to the invention or one or more preferred variants of the headlamp according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
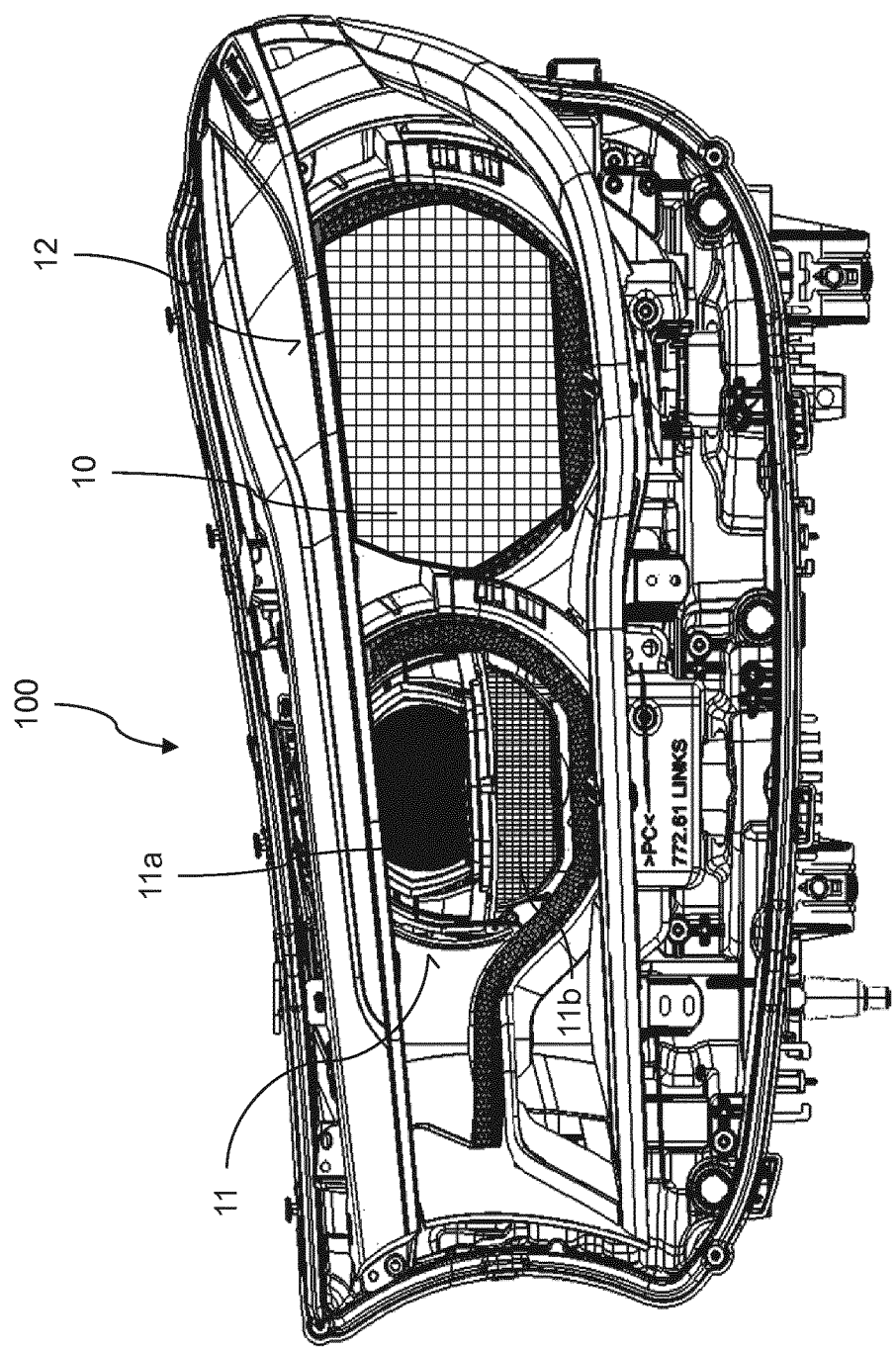
FIG. 1 is a perspective illustration of a headlamp according to an embodiment of the invention.

An embodiment of the invention will be explained below on the basis of the left motor vehicle front headlamp 100 shown in FIG. 1. This front headlamp comprises an inner illumination device 11, known per se, by means of which a static base light distribution of both the low beam and the high beam of the headlamp is generated. To this end, an upper macro-optical illumination unit 11a on the basis of projection optics with macro-lenses is provided in the illumination device 11. The macro-lenses have a substantially larger diameter than the projection lenses of the multi-aperture projection display described below. When the low beam is activated, the illumination unit 11a is used to produce the static component of the low beam distribution that cannot be varied.

The illumination device 11 further contains a lower macro-optical illumination unit 11b based on reflection optics. This illumination unit 11b is activated in addition to the illumination unit 11a when a (non-antiglare) high beam distribution is generated by the headlamp. The light distribution produced by the illumination unit 11b is also static. In a preferred variant, the two illumination units 11a and 11b use one or more LEDs as illuminants. Nevertheless, the illumination units may optionally also contain a xenon light source and/or a laser light source.

In addition to the inner illumination device 11, the headlamp 100 comprises an outer illumination device 12. In conventional headlamps, the latter is formed analogously to the illumination device 11 from macro-optical illumination units on the basis of projection optics and reflection optics. In said conventional case, a dynamic light distribution is generated by the outer illumination device in addition to the static light distribution of the inner illumination device, said dynamic light distribution being able to dynamically change (i.e. change in a time-varying fashion) the position thereof and possibly further characteristics in the overall light distribution of both illumination device s 11 and 12. To this end, the outer illumination device 12 is mechanically movable. By means of the dynamic light distribution of the outer illumination device, it is possible, for example, to realize the function of a cornering light, which changes the light distribution in the curve direction during cornering.

The embodiment of the headlamp according to the invention described here is distinguished by virtue of the outer illumination device 12 for producing a dynamic component of the headlamp light no longer being moved mechanically but comprising a multi-aperture projection display 10 to this end, said multi-aperture projection display having a multiplicity of projection lenses, each having a segment of an LCD display assigned thereto, wherein the segment is projected in front of the headlamp by way of the associated projection lens. In the segments, an object structure of transmissive and light-opaque regions is formed by means of the LCD display, wherein the object structure can be changed by way of an appropriate actuation of the LCD display. Specifically, the components of transmissive and light-opaque regions of the respective segments are dynamically changed in the process in order thereby to produce a movement of the generated light distribution, for example. In this way, the dynamic component of the overall light distribution generated by the headlamp is achieved purely by actuation of an LCD display without mechanical measures.

The dynamic light distribution produced by means of the illumination device 12 can be adapted quickly and flexibly to various driving parameters or parameters in the surroundings. Specifically, the multi-aperture projection display can be used to produce a cornering light. Other dynamic light distributions can likewise be generated. By way of example, an antiglare high beam can be produced with the aid of the projection display. To this end, the high beam is purely formed by way of the illumination unit 11a of the inner illumination device 11 and the multi-aperture projection display 10 of the outer illumination device, wherein those regions that would lead to dazzling of traffic ahead or oncoming traffic are cut from the high beam distribution by an appropriate actuation of the LCD display in the outer illumination device.

Likewise, a marking light, in which certain regions in the overall light distribution are illuminated more strongly and therefore brightened, can be generated with the illumination device 12. Moreover, the illumination device 12 may optionally serve to produce a city light, which brings about a broader illumination of the roadway with a lower brightness. Further, it is optionally possible to produce a freeway light, in which the roadway is illuminated with little width but greater brightness. Moreover, it is also possible to optionally generate a guide light, which conveys the intended direction of travel to the driver of the motor vehicle. Further, it is optionally also possible to generate a light distribution in the form of a construction-site light, in which the light distribution is narrowed when passing through a constriction. A further case of application is the production of an emergency maneuvering light, in which the direction in which steering should take place is indicated to the driver in the case of a hazardous situation by way of an appropriate illumination of a certain region. Using the multi-aperture projection display, it is also possible to produce a light staging during the vehicle start by way of an appropriate actuation of the LCD display by virtue of the headlamp being temporarily deactivated at this time and a dynamic movement in the light distribution being generated by appropriate changes in the structures of the segments.

Figure 2:
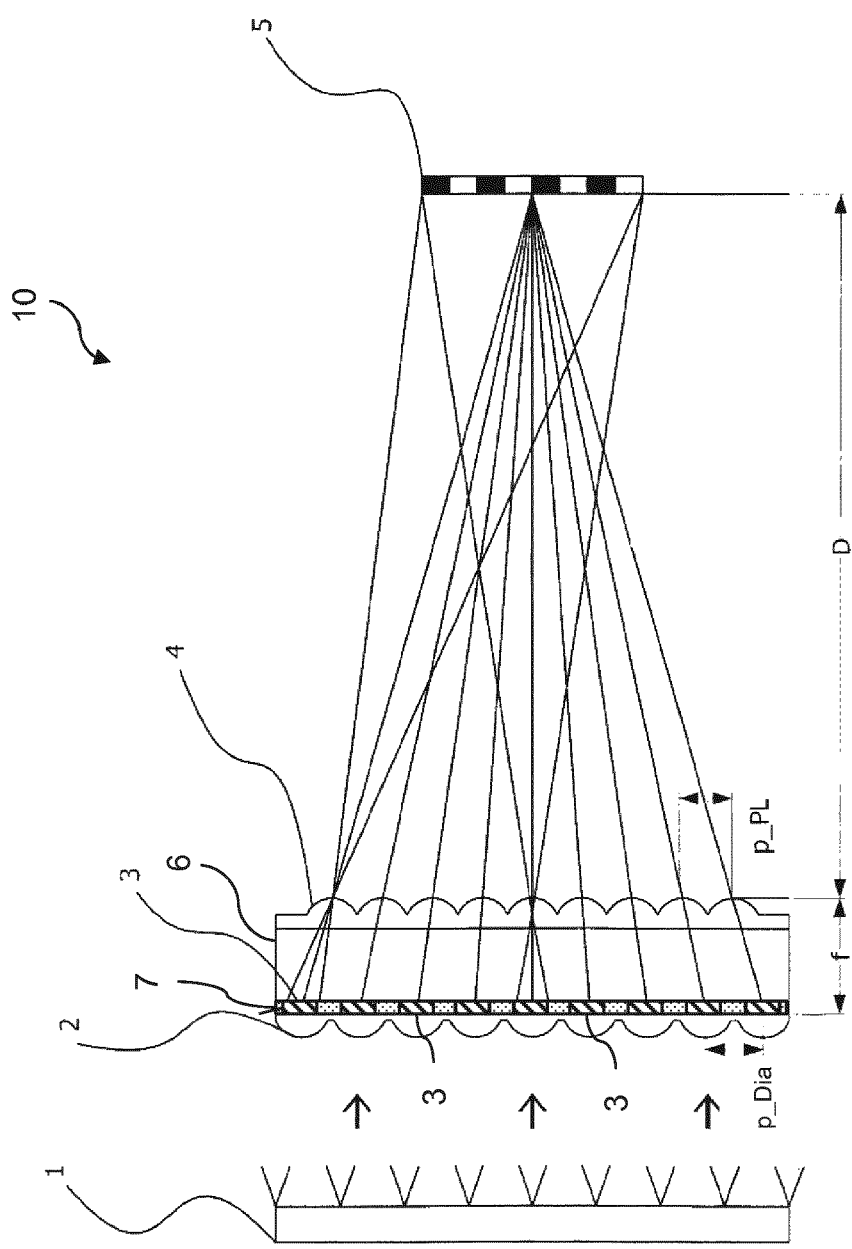
FIG. 2 is a sectional view through the multi-aperture projection display of the headlamp from FIG. 1.

FIG. 2 shows a sectional view of the multi-aperture projection display 10 that is used in the headlamp of FIG. 1 and that corresponds to a display from document DE 10 2009 024 894 A1 (see FIG. 10 therein). The projection display 10 comprises an illuminant 1, which can be embodied as a laser diode, LED or OLED, for example. The light of the illuminant strikes the field lens array in the form of a multiplicity of condenser lenses 2, which are applied to the substrate 6 (e.g. a glass substrate), wherein an LCD display 7 is situated adjacent to the field lens array. The LCD display generates the variable segments 3 with object structures made of transmissive and light-opaque regions contained therein. The segments are indicated by hatched portions in the LCD display 7 and only partly denoted by the reference sign 3 for reasons of clarity. An array of projection lenses 4 is situated on the right-hand side of the glass substrate, wherein the distance between the projection lenses 4 and the segments 3 substantially corresponds to the focal length f of the individual projection lenses. Each projection lens 4 is assigned to a segment 3 or an object structure, which is imaged by the corresponding projection lens into the projection plane 5 at a distance D from the array of projection lenses. This is elucidated by the illustrated beam paths. It is possible to identify here that the pitch distance p_Dia between adjacent segments 3 is greater than the pitch distance p_PL between adjacent projection lenses 4. This brings about a tilt of the optical axes of the corresponding pairs of object structure and projection lens and consequently achieves a superposition of all projected images of the object structures 3 to form an overall image in the projection plane 5.

The magnification M of the overall image in the projection plane 5 follows from the ratio of the projection distance D to the focal length f of the projection lenses 4 and is as follows:

$$M = \frac{D}{f} = \frac{p\_PL}{p\_Dta - p\_PL} \quad (1)$$

Consequently, the magnification is dependent on the difference of the pitch distances between the object structures and the projection lenses. The smaller this difference, the greater the magnification and the further the projection plane lies away from the projection display.

The embodiments of the invention described above have a number of advantages. In particular, it is possible to generate a dynamic component in the headlamp light without movable parts in a vehicle headlamp. In the process, it is possible to produce different illumination effects, such as e.g. a cornering light, and antiglare high beam and the like. Using a multi-aperture projection display with a high-resolution LCD display, it is possible to quickly and highly precisely produce a dynamic light component. Using the variants of the multi-aperture projection display known per se, it is further possible to generate dynamic light distributions with an extended depth of field.

LIST OF REFERENCE SIGNS

100 Headlamp
10 Multi-aperture projection display
11 Inner illumination device
11a, 11b Illumination units of the inner illumination device
12 Outer illumination device
1 Illuminant
2 Condenser lenses
3 Segments
4 Projection lenses
5 Projection plane
6 Glass substrate
7 LCD display The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A headlamp for a motor vehicle, comprising:
   a first illumination device and a second illumination device for jointly producing a light distribution in front of the headlamp, wherein
   the first illumination device produces a static component of the light distribution and the second illumination device produces a dynamic component of the light distribution,
   the second illumination device comprises a multi-aperture projection display having an illuminant and a planar digital image generator, and an array of projection lenses configured to receive light from the second illuminant but not from the first illumination device,
   the digital image generator comprises segments with a changeable division of the respective segment in transmissive and light-opaque regions and each projection lens is assigned to a segment of the digital image generator such that, when the array is illuminated by the illuminant, at least some of the segments are projected in front of the headlamp by the assigned projection lenses, and
   the headlamp is configured such that the digital image generator produces the dynamic component of the light distribution during operation of the headlamp in the motor vehicle by changing the division of transmissive and light-opaque regions for at least some of the segments.

2. The headlamp as claimed in claim 1, wherein
a low beam distribution, a high beam distribution, and/or an antiglare high beam is producible using the headlamp.

3. The headlamp as claimed in claim 1, wherein
the headlamp is configured such that the dynamic component of the light distribution produced by the second illumination device is produced during operation of the headlamp in the motor vehicle depending on one or more driving parameters of the motor vehicle and/or one or more parameters in surroundings of the motor vehicle.

4. The headlamp as claimed in claim 1, wherein
the headlamp is configured such that a dynamic light/dark boundary of a low beam distribution is produced using the second illumination device in one mode of operation of the headlamp, and
the width of the light distribution is modified using the second illumination device in one mode of operation of the headlamp, and/or
objects in the surroundings of the motor vehicle are illuminated more strongly or less strongly using the second illumination device in one mode of operation of the headlamp.

5. The headlamp as claimed in claim 1, wherein
the first illumination device is an illumination device without lenses or an illumination device with one or more lenses, wherein, in a plan view, a respective lens has a minimal extent of 1 cm or more.

6. The headlamp as claimed in claim 5, wherein the minimal extent is 3 cm or more.

7. The headlamp as claimed in claim 5, wherein
the first illumination device comprises a maximum of 25 lenses.

8. The headlamp as claimed in claim 5, wherein
the first illumination device comprises an illumination unit with projection optics and/or an illumination unit with reflection optics.

9. The headlamp as claimed in claim 1, wherein
the digital image generator of the second illumination device comprises an LCD display.

10. The headlamp as claimed in claim 1, wherein
the transmissive regions in the respective segments of the digital image generator have a fixed transmittance of 100% or a variable positive transmittance of at most 100%.

11. The headlamp as claimed in claim 1, wherein
the headlamp is a front headlamp of the motor vehicle.

12. A motor vehicle, comprising one or more headlamps as claimed in claim 1.

* * * * *